(12) United States Patent
Hershman

(10) Patent No.: US 10,740,499 B2
(45) Date of Patent: Aug. 11, 2020

(54) ACTIVE SHIELD PORTION SERVING AS SERIAL KEYPAD

(71) Applicant: Nuvoton Technology Corporation, Hsin-chu (TW)

(72) Inventor: Ziv Hershman, Givat Shmuel (IL)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 326 days.

(21) Appl. No.: 15/917,854

(22) Filed: Mar. 12, 2018

(65) Prior Publication Data

US 2019/0278951 A1 Sep. 12, 2019

(51) Int. Cl.
*G06F 21/83* (2013.01)
*H05K 9/00* (2006.01)

(52) U.S. Cl.
CPC ........... *G06F 21/83* (2013.01); *H05K 9/0071* (2013.01)

(58) Field of Classification Search
CPC .............................. G06F 21/83; H05K 9/0071
See application file for complete search history.

(56) References Cited

U.S. PATENT DOCUMENTS

| | | | |
|---|---|---|---|
| 4,882,779 A * | 11/1989 | Rahtgen | G07F 7/1016 705/72 |
| 5,117,457 A | 5/1992 | Comerford et al. | |
| 5,613,012 A | 3/1997 | Hoffman et al. | |
| 5,764,789 A | 6/1998 | Pare, Jr. et al. | |
| 5,790,670 A | 8/1998 | Bramlett | |
| 5,805,719 A | 9/1998 | Pare, Jr. et al. | |
| 5,870,723 A | 2/1999 | Pare, Jr. et al. | |
| 5,956,415 A | 9/1999 | McCalley et al. | |
| 5,998,858 A | 12/1999 | Little et al. | |
| 6,154,879 A | 11/2000 | Pare, Jr. et al. | |
| 6,366,682 B1 | 4/2002 | Hoffman et al. | |
| 7,065,656 B2 | 6/2006 | Schwenck et al. | |
| 7,152,045 B2 | 12/2006 | Hoffman | |
| 7,180,008 B2 | 2/2007 | Heitmann et al. | |
| 7,590,880 B1 | 9/2009 | Hershman | |

(Continued)

FOREIGN PATENT DOCUMENTS

| | | |
|---|---|---|
| CA | 2654060 A1 | 12/2007 |
| DE | 19705518 A1 | 8/1998 |

(Continued)

OTHER PUBLICATIONS

McGregor et al., "Protecting Cryptographic Keys and Computations via Virtual Secure Coprocessing", Workshop on Architectural Support for Security and Antivirus (WASSA) held in conjunction with ASPLOS-XI, 11 pages, Oct. 2004.

(Continued)

*Primary Examiner* — Ricardo Osorio
(74) *Attorney, Agent, or Firm* — Kligler & Associates Patent Attorneys Ltd

(57) ABSTRACT

An apparatus includes an electronic circuit, a keypad and an active-shield layer. The keypad includes one or more keys for entering data to the electronic circuit by a user. The active-shield layer is placed between the electronic circuit and the keypad, and includes one or more electrical conductors laid in a pattern that shields at least a portion of the electronic circuit. In a specified region, the one or more electrical conductors of the active-shield layer are shaped to form contacts for sensing the one or more keys.

12 Claims, 2 Drawing Sheets

(56) References Cited

U.S. PATENT DOCUMENTS

| | | |
|---|---|---|
| 7,797,115 B2 | 9/2010 | Tasher et al. |
| 7,889,778 B2 | 2/2011 | Marinet et al. |
| 7,978,070 B2 | 7/2011 | Hunter |
| 7,988,054 B2 | 8/2011 | Garrklo-Gadea et al. |
| 8,238,110 B2 * | 8/2012 | Bonnet .................. G06F 21/86 200/50.01 |
| 8,240,038 B1 | 8/2012 | Sham et al. |
| 8,378,710 B1 | 2/2013 | Al-Kadi et al. |
| 8,513,548 B2 | 8/2013 | Rollet et al. |
| 8,572,677 B2 * | 10/2013 | Bartholomay ...... H04L 63/0227 726/1 |
| 8,700,908 B2 * | 4/2014 | Rickman ............... G06F 21/606 713/182 |
| 9,055,679 B2 | 6/2015 | Ohsaka |
| 9,146,644 B2 | 9/2015 | Hershman et al. |
| 9,239,655 B2 | 1/2016 | Hershman |
| 9,450,586 B2 | 9/2016 | Hadley |
| 9,481,499 B2 | 11/2016 | Zhang et al. |
| 9,507,968 B2 | 11/2016 | Bytheway |
| 9,578,764 B1 | 2/2017 | Fisher et al. |
| 9,661,747 B1 | 5/2017 | Brodsky et al. |
| 9,679,166 B2 | 6/2017 | Yasutomi et al. |
| 9,721,199 B2 | 8/2017 | Salle et al. |
| 9,892,293 B1 * | 2/2018 | Wade .................. G06K 7/10277 |
| 10,489,760 B2 * | 11/2019 | Magee ..................... G06F 3/16 |
| 2005/0039040 A1 | 2/2005 | Ransom et al. |
| 2007/0016963 A1 | 1/2007 | Robinson |
| 2009/0249460 A1 | 10/2009 | Fitzgerald et al. |
| 2009/0328218 A1 | 12/2009 | TsurukaWa |
| 2014/0016779 A1 | 1/2014 | Lirakis |
| 2014/0306014 A1 | 10/2014 | Salle et al. |
| 2014/0308823 A1 | 10/2014 | Pavageau et al. |
| 2015/0036423 A1 | 2/2015 | Kawahara et al. |
| 2016/0098097 A1 * | 4/2016 | Chang .................. H01H 13/86 345/169 |
| 2016/0203343 A1 | 7/2016 | Soifer et al. |
| 2016/0218071 A1 | 7/2016 | Nam et al. |
| 2018/0316082 A1 * | 11/2018 | Keller, III ............ H01Q 1/2275 |

FOREIGN PATENT DOCUMENTS

| | | |
|---|---|---|
| DE | 202014101751 U1 | 4/2014 |
| EP | 0268882 A1 | 6/1988 |
| EP | 1160647 A2 | 12/2001 |
| ES | 2382218 T3 | 6/2012 |
| FR | 2710179 A1 | 3/1995 |
| FR | 2985154 A1 | 6/2013 |
| JP | 0782459 B2 | 9/1995 |
| JP | 3649690 B2 | 5/2005 |
| WO | 2007019642 A1 | 2/2007 |

OTHER PUBLICATIONS

Meshack., "A survey of computer security vulnerability in the banking industry in kenya", Management research project, MBA desgree,Faculty of commerce, University of Nairobi, 145 pages, Jun. 8, 2016.

Sastry et al., "Tamper Proofing of the Tags through Pressure Sensing", International Journal of Emerging Trends & Technology in Computer Science (IJETTCS), vol. 3, issue 3, 4 pages, May-Jun. 2014.

Wanderley et al., "Security FPGA Analysis", Security Trends for FPGAS, Chapter 2, 41 pages, year 2011.

Feller., "Design Security and Cyber-Physical Threats", Trustworthy Reconfigurable Systems, Springer, 2 pages, year 2014.

* cited by examiner

ACTIVE SHIELD PORTION SERVING AS SERIAL KEYPAD

FIELD OF THE INVENTION

The present invention relates generally to secure keypads, and particularly to active shield portions serving as keypad contacts.

BACKGROUND OF THE INVENTION

Various types of secure keypads and methods for securing keypads are known in the art. For example, U.S. Pat. No. 8,238,110 describes devices for protection against intrusions of electronic devices containing a keyboard for entering confidential data. An anti-interference advice for a housing includes at least two electrically conductive terminals distinctly positioned on an electronic card and connected to processing means, and a protective circuit positioned relative to the two electrically conductive terminals in such a manner as to close the electrical circuit during the normal utilization position of the housing. The protective circuit includes means adapted for opening the electrical circuit closed in response to a deterioration in the protective circuit.

SUMMARY OF THE INVENTION

An embodiment that is described herein provides an apparatus including an electronic circuit, a keypad and an active-shield layer. The keypad includes one or more keys for entering data to the electronic circuit by a user. The active-shield layer is placed between the electronic circuit and the keypad, and includes one or more electrical conductors laid in a pattern that shields at least a portion of the electronic circuit. In a specified region, the one or more electrical conductors of the active-shield layer are shaped to form contacts for sensing the one or more keys.

In some embodiments, the electronic circuit is configured to send one or more signals via one or more of the electrical conductors of the active-shield layer, to sense the signals and, based on the sensed signals, to detect a security attack on the electronic circuit or on the keypad. In some embodiments, the electronic circuit is configured to sense one or more of the electrical conductors of the active-shield layer and, based on the sensed electrical conductors, to distinguish between (i) a legitimate key activation by the user and (ii) a security attack on the electronic circuit or on the keypad.

In an example embodiment, the electronic circuit is configured to transmit at least a first signal to the active-shield layer, to receive at least a second signal from the active-shield layer, and to distinguish between the legitimate key activation and the security attack by measuring time delay between the first and second signals. In another embodiment, the electronic circuit is configured to distinguish between the legitimate key activation and the security attack by measuring a capacitance of an electrical conductor of the active-shield layer. In yet another embodiment, the electronic circuit is further configured to distinguish between legitimate activation of a single key and legitimate activation of multiple keys.

In a disclosed embodiment, the electronic circuit is configured to transmit dummy signals to the active-shield layer. In an embodiment, the active-shield layer is fabricated in a multi-layer substrate, and, in at least a section of the active-shield layer, first and second electrical conductors of the active-shield layer are routed one beneath the other in different layers.

In some embodiments, the keypad and the active-shield layer are configured such that activation of a key short-circuits a pair of the electrical conductors of the active-shield layer. In other embodiments, the keypad and the active-shield layer are configured such that activation of a key breaks a normally-closed electrical continuity of an electrical conductor of the active-shield layer. In yet other embodiments, the keypad and the active-shield layer are configured such that activation of a key connects a respective capacitor to an electrical conductor of the active-shield layer.

There is additionally provided, in accordance with an embodiment of the present invention, a method including sensing one or more electrical conductors of an active-shield layer, which is placed between an electronic circuit and a keypad including one or more keys for entering data to the electronic circuit by a user. The one or more electrical conductors of the active-shield layer are laid in a pattern that shields at least a portion of the electronic circuit, and, in a specified region, the one or more electrical conductors are shaped to form contacts for sensing the one or more keys. A security attack on the electronic circuit or on the keypad is detected based on the sensed electrical conductors.

There is further provided, in accordance with an embodiment of the present invention, a method including providing an electronic circuit, and providing a keypad including one or more keys for entering data to the electronic circuit. An active-shield layer is placed between the electronic circuit and the keypad. The active-shield layer includes one or more electrical conductors laid in a pattern that shields at least a portion of the electronic circuit. In a specified region, the one or more electrical conductors of the active-shield layer are shaped to form contacts for sensing the one or more keys.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for securing electronic devices against security attacks, and in particular securing data entry via keypads. The disclosed techniques can be used in various types of electronic devices that comprise keypads, such as credit-card or Point-of-Sale (PoS) terminals, personal computers and many others. Such an electronic device typically comprises an electronic circuit, and a keypad comprising one or more keys for entering data to the electronic circuit by a user.

In order to secure the device, in some embodiments an active-shield layer is placed between the electronic circuit and the keys. The active-shield layer comprises one or more electrical conductors, e.g., circuit traces, laid in a pattern that covers and shields at least a portion of the electronic circuit. The electronic circuit typically sends one or more signals via the active-shield layer, senses the signals, and analyzes the sensed signals to detect suspected security attacks.

In some embodiments of the present invention, one or more of the electrical conductors of the active-shield layer are also used for sensing the keys of the keypad. In these embodiments, the electrical conductors of the active-shield layer that pass below the keypad are shaped to form contacts for sensing the keys. The electronic circuit is configured to sense the signals from the active-shield layer, and, based on the sensed signals (i) detect and read legitimate key presses by the user, and (ii) detect security attacks on the keypad or on the electronic circuit in general.

The keypad sensing scheme used in the disclosed embodiments is typically serial, i.e., uses the same electrical line or pair of lines for sensing a group of keys. Sensing key presses may be based on measurement of propagation delay or capacitance, for example. Several examples of serial sensing schemes, and their integration as part of an active-shield layer, are described herein.

By reusing the same hardware for active-shielding and keypad sensing, the disclosed techniques provide a high level of security against security attacks, combined with low cost, small part-count and small size.

System Description

Figure 1:
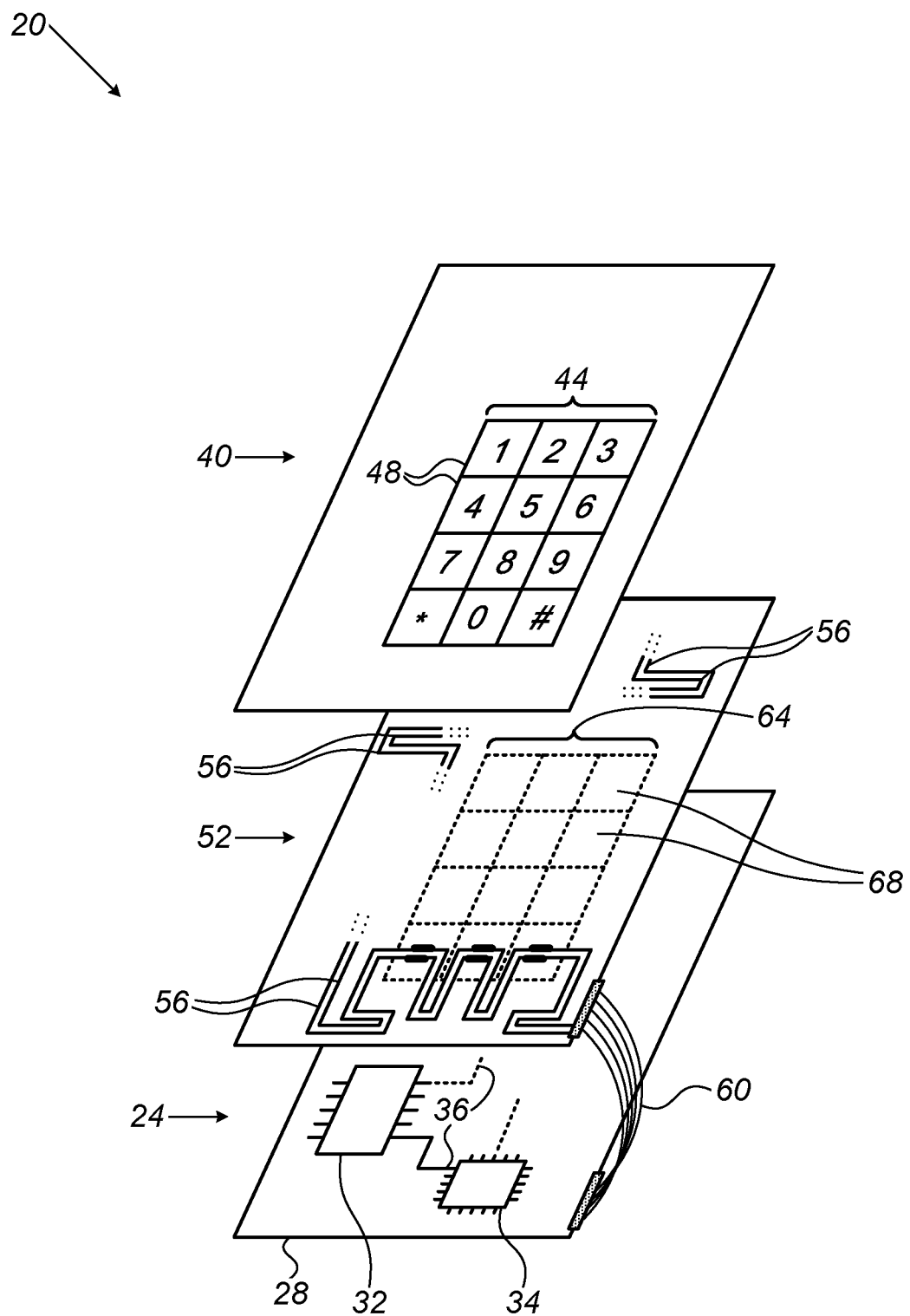
FIG. 1 is a schematic, exploded view of an electronic device comprising a keypad, in accordance with an embodiment of the present invention.

FIG. 1 is a schematic, exploded view of an electronic device 20, in accordance with an embodiment of the present invention. Device 20 comprises an electronic circuit 24, and a keypad 44 used for entering data to circuit 24. Device 20 may comprise, for example, a credit card terminal, a Point-of-Sale (PoS) terminal, an Automatic Teller Machine (ATM), a control panel of an alarm or access-control system, a computer, or any other suitable device having a keypad.

In the present example, keypad 44 is located on a front panel 40 of device 20, and comprises multiple keys 48. The embodiment of FIG. 1 shows a numeric keypad having twelve keys, purely by way of example. Alternatively, the keypad may have any desired number and arrangement of keys. In the present context, the term "keypad" refers to any input device having one or more keys, e.g., a single key or a full alphanumeric keyboard. The term "key" refers to any suitable type of key, such as push-button, capacitive sensor or mechanical switch, for example. The term "press" is used in a broad sense and refers to any activation of a key by a user. The terms "key-press" and "key activation" are used interchangeably herein.

In the present example, electronic circuit 24 comprises a Printed Circuit Board (PCB) 28 on which various electronic components 32 and circuit traces 36 are disposed. In particular, a controller 34 controls keypad 44.

In many practical cases, keypad 44 is used for entering secret or otherwise sensitive information to circuit 24, such as credit card numbers, passwords or Personal Identification Numbers (PINs). As such, keypad 44, circuit 24, and device 20 as a whole, are potential targets for various security attacks that attempt to extract the sensitive information. An attacker may, for example, attempt to penetrate device 20 and connect to keypad 44 or circuit 24 in order to sense and/or inject signals.

In order to detect security attacks, device 20 comprises an active-shield layer 52 that is placed between panel 40 and circuit 24. Active-shield layer 52 comprises one or more electrical conductors 56 disposed on a substrate, e.g., circuit traces on a PCB. In the description that follows, the terms "electrical conductors," "traces" and "lines" are all used interchangeably.

Lines 56 are typically laid in a dense two-dimensional pattern, e.g., a snake-like pattern, which covers and shields at least part of circuit 24. FIG. 1 shows only a small, simplified part of this snake-like pattern, in order not to obscure the figure. In real-life implementations, to provide effective active shielding, the pattern of lines 56 covers the entire area of layer 52 with high density, minimal pitch and minimal spacing between lines. Generally, active-shield layer 52 is designed such that the spacing and pitch between adjacent lines 56 is minimal, so as to prevent even a narrow probe from penetrating between or through lines without being detected. Note that the serpentine ("snake-like") shape of lines 56 for each key 48 is not mandatory, and is depicted in FIG. 1 purely by way of example.

Lines 56 are connected to circuit 24, e.g., using a flat-cable interconnect 60. Controller 34 in circuit 24 transmits one or more electrical signals via lines 56, and analyzes the signals received from lines 56 in response to the transmitted signals. By analyzing the received signals, e.g., detecting abnormalities in the received signals, controller 34 is able to detect security attacks. In various embodiments, controller 34 may use any suitable signals and any suitable analysis technique for detecting abnormalities and for distinguishing between legitimate key presses, innocent abnormalities (e.g., signal transients) and suspected attacks. Controller 34 may, for example, measure the received signals continuously or periodically and look for coherency or abnormality, set upper bounds on the maximum number of times or the maximum time duration of a legitimate key press, or perform any other suitable action.

In some embodiments, lines 56 of active-shield layer 52 also serve for sensing keypad 44. As part of the active-shield layer, lines 56 pass through a region 64 that lies below keypad 44. In region 64, dashed cells 68 mark the areas below respective keys 48. In each cell 68, one or more of lines 56 are shaped so as to form a contact for sensing whether the respective key 48 is pressed or not.

In some embodiments, as seen in FIG. 1, the sections of lines 56 passing underneath keys 48 are wider, or otherwise have shapes that are configured to make high-quality electrical contact with keys 48, or they may be segmented, while the connection between the segments is controlled by key switches. This configuration, however, is not mandatory, and any other suitable configuration can be used. For example, in an alternative embodiment the width of lines 56 does not change when passing underneath keys 48. Instead, in the area beneath a certain key, lines 56 may be formed in a serpentine or other pattern that covers the footprint of the key, before progressing to the next key. When the key is pressed, contact may be made at several points on the footprint.

Several example implementations for joint keypad-sensing and active-shielding are described in FIGS. 2-4 below. Since lines 56 are used both for keypad sensing and for active shielding, the received signals provided to controller 34 are affected both by key presses and by security attacks.

In various embodiments, controller 34 is configured to distinguish between legitimate key presses and hostile attacks. When the received signals indicate a key press, controller 56 is configured to identify which of keys 48 was pressed. In some embodiments controller 34 is able to detect multi-touch events, i.e., multiple keys pressed simultaneously, and identify which keys were pressed. In other embodiments, controller 34 is only able to detect pressing of a single key. Controller 34 is also typically configured to distinguish a "no touch" event, in which no key is pressed and no attack is suspected.

Upon detecting a legitimate key press, controller 34 typically indicates the fact that a key was pressed, and the identity of the pressed key, to suitable circuitry in circuit 24. Upon detecting a security attack, controller 34 typically initiates or performs a suitable responsive action. Examples of responsive actions may comprise alerting the user, shutting-down part or all of circuit 24, erasing sensitive information, or any other suitable action.

Figure 2:
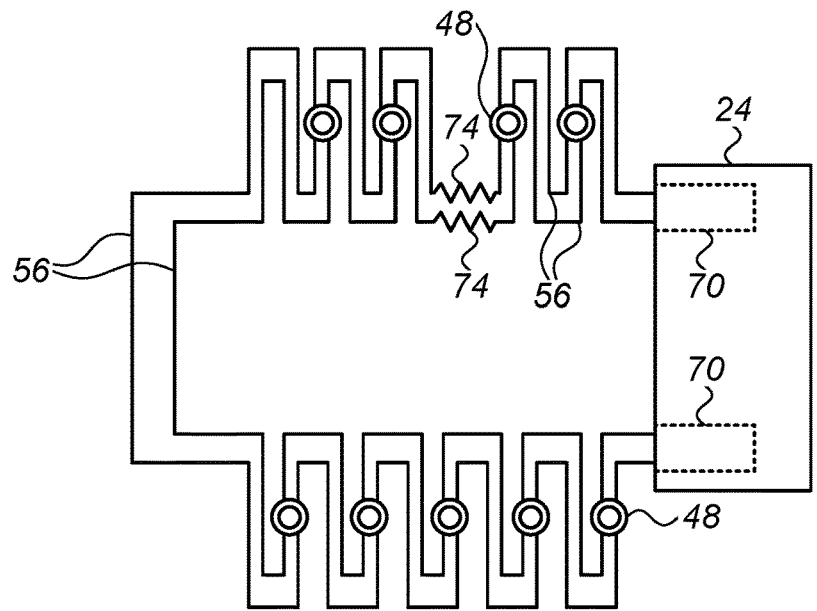
FIGS. 2-4 are block diagrams that schematically illustrate joint active-shield and keypad-sensing circuits, in accordance with embodiments of the present invention.
Figure 3:
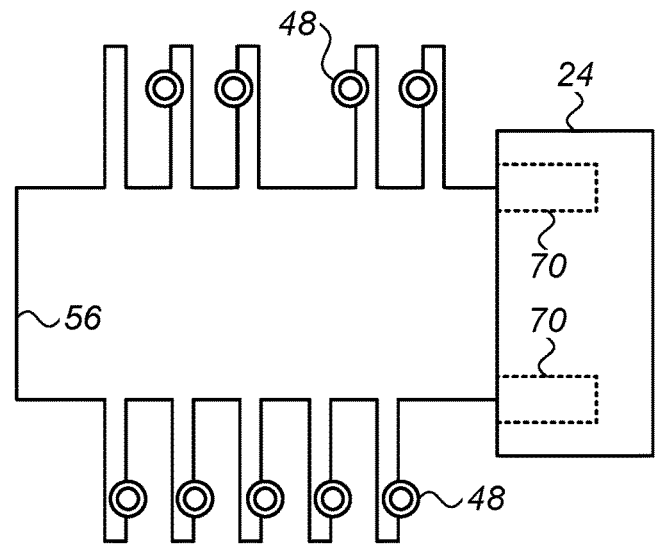
Figure 4:
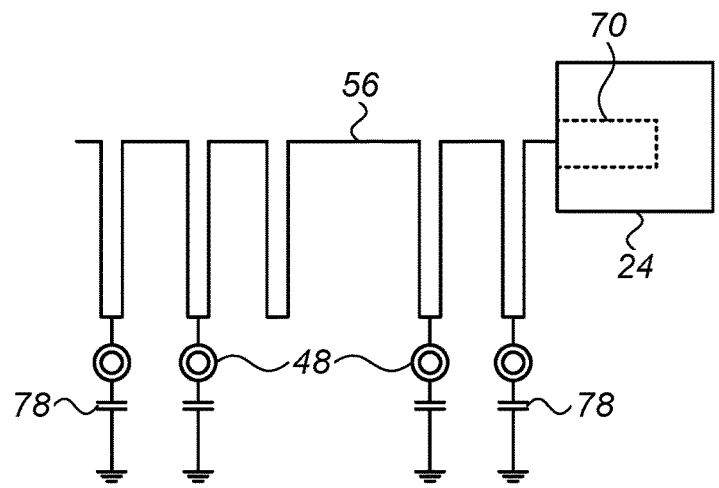

The configuration of device 20 shown in FIG. 1, and the joint active-shield and keypad-sensing configurations shown in FIGS. 2-4, are example configurations that are depicted purely for the sake of conceptual clarity. In alternative embodiments, any other suitable configurations can be used.

In various embodiments, the different elements of device 20 shown in FIG. 1, and the different elements shown in FIGS. 2-4, may be implemented using any suitable hardware, such as using one or more discrete components, one or more Application-Specific Integrated Circuits (ASICs) and/or one or more Field-Programmable Gate Arrays (FPGAs). Some of the functions of device 20, e.g., some or all of the functions of controller 34, may be implemented in software, or using a combination of software and hardware elements.

In some embodiments, controller 34 comprises a general-purpose processor, which is programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

Example Joint Active-Shield and Keypad Sensing Configurations

FIG. 2 is a block diagram that schematically illustrates a joint active-shield and keypad-sensing circuit, in accordance with an embodiment of the present invention. In the circuit of FIG. 2, controller 34 (seen in FIG. 1 above) senses key presses and detects security attacks by measuring propagation delay on lines 56.

In this example, a pair of lines 56 passes serially below keys 48. When a certain key 48 is pressed, the key short-circuits the two lines. In some embodiments, resistors 74 may be inserted serially in lines 56, for example, on in at least one of lines 56, between two keys. The pair of lines 56 is connected at one end to circuit 24 via a pair of I/O pins 70, and (optionally) at the opposite end via another pair of I/O pins 70.

Consider first a configuration in which lines 56 are connected to I/O pins 70 only at one end. The far end of the line pair may be open-ended or shorted. Controller 34 transmits a signal (e.g., toggles a short pulse) via one of pins 70, and measures the time delay between the transmitted signal and a returned signal on the other pin 70.

If no key is pressed and no attack is present, controller 34 will not detect a returned signal (in implementations in which the far end is open-ended), or the measured time delay will have some maximal known value (in implementations in which the far end is shorted).

If a key is pressed by a user, controller 34 will detect a predefined time delay that depends on the location of the key along the pair of lines 56. A key that is closer to pins 70 will cause a short time delay, and vice versa. In an embodiment, controller 34 holds a predefined list of the expected time delays for the respective keys 48. If a measured time delay matches one of the expected time delays on the list (possibly with predefined error margin), controller 34 concludes that a legitimate key press was performed, and determines the identity of the key from the time-delay value.

In an embodiment, if controller 34 measures a time delay that differs from any of the expected values (e.g., not within the predefined error margin), the controller may decide that such a measurement is indicative of an attack. An attack may also be declared if (1) the controller senses a returned signal not in response to any transmitted signal, or (2) if a key press is detected for too long or too short periods (relative to predefined 'short' and 'long' threshold values).

Consider now a configuration in which lines 56 are connected to a first pair of I/O pins 70 at one end, and to a second pair of I/O pins 70 at the opposite end. In an embodiment, controller 34 performs the procedure described above (transmitting a signal via one pin 70, receiving the signal via the other pin 70 in the pair, and measuring time delay between the two signals) separately for the first pair of pins 70, and for the second pair of pins 70. Controller 34 then analyzes both results, and decides whether no event occurred, whether a key was pressed, or whether an attack was attempted. This configuration also enables controller 34 to detect simultaneous pressing of two keys. In this configuration, controller 34 may measure each I/O pins 70 pair at a different time while keeping the other pair logically disconnected (floating).

In this embodiment, controller 34 typically holds two expected time delays for each key 48—One expected time delay using the first pair of pins 70, and another expected time delay using the second pair of pins 70. If a single key is pressed, the two time delays (with respect to the two pairs of pins 70) will match the expected time delays defined for the same key. If two keys are pressed, the two time delays will match expected time delays defined for different keys (each key will be detected by via the pair of pins 70 closer to it). As before, a deviation from an expected time delay, on any pair of pins 70, will typically be regarded as an attack.

Put more generally, controller 34 may transmit a signal on any of the four pins 70, and measure time delay on one or more of the other pins 70. Furthermore, the controller may transmit a signal simultaneously on more than a single pin 70. Any number of such measurements can be predefined, along with expected time delays that are indicative of legitimate key presses. Deviation from an expected time delay will be regarded as an attack.

In any of the above techniques, controller 34 may define a certain maximal permitted deviation from an expected time delay. If a measured time delay differs from an expected time delay of a certain key 48 by less than the permitted deviation, the measured time delay is regarded as "matching" the expected time delay of that key. Otherwise, i.e., if the measured time delay differs from all expected time delays by more than the permitted deviation, an attack is declared.

In an embodiment, a measured time delay that differs from all expected time delays by more than the permitted deviation may be indicative of either (i) multiple keys pressed simultaneously ("multi-touch"), (ii) a transient between two legitimate key presses, or (iii) an attack. Controller 34 may rule-out the first two possibilities (which are considered legitimate) by verifying that the deviation is temporary.

In some embodiments, lines 56 can be designed as a resistive (R) or resistive-capacitive (RC) network with embedded resistors and capacitors. Resistors 74 can be installed between any two keys, e.g., between every two successive keys. Alternately, the natural resistance of lines 56 (e.g., in case the lines are made of a resistive material like indium tin oxide (ITO)) can be used as the resistance of the R or RC network. Controller 34 may measure the RC delay between lines 56, or the resistance between lines 56, to decide on key press location and legality.

In some embodiments, lines 56 can be designed as transmission lines (e.g., microstrip or stripline), in which case resistors 74 are not needed. In such a case, controller 34 may trigger a high transition pulse on one line 56 and measure the pulse propagation delay to the other line 56 of the same I/O 70 pins pair.

In some embodiments, controller 34 may occasionally generate false dummy signals on one or more of pins 70, in order to obfuscate the real measurements. For example, following the transmission of each real signal (that is genuinely used for time-delay measurement), controller 34 may transmit a dummy signal having similar characteristics on the other pins 70.

In an embodiment, active-shield layer 52 is fabricated in a multi-layer substrate (e.g., multi-layer PCB). In at least a section of a pair of lines 56, the two lines 56 in the pair are routed in different PCB layers, such that one line is located beneath the other (with the exception of the areas beneath the keys). In this technique, one line 56 also serves as an active shield for the other line, and further increases the resilience of device 20 to attack attempts.

FIG. 3 is a block diagram that schematically illustrates a joint active-shield and keypad-sensing circuit, in accordance with an alternative embodiment of the present invention. In the embodiment of FIG. 3, controller 34 senses key presses and detects security attacks by measuring the serial capacitance of a single line 56.

In the present example, a line 56 passes serially below keys 48. Keys 48 in this implementation are "normally closed" (i.e., maintain the electrical continuity of line 56 when not pressed, and break the continuity of line 56 when pressed). Lines 56 is connected at one end to circuit 24 via a single I/O pin 70, and (optionally) at the opposite end via another single I/O pin 70.

Consider first a configuration in which line 56 is connected to an I/O pin 70 only at one end, while the far end of the line is open-ended. Controller 34 transmits a signal via pin 70, and measures the capacitance of line 56. Any suitable technique can be used for measuring the line capacitance. One example technique for measuring the self-capacitance of a line is described in U.S. Pat. No. 7,797,115, which is assigned to the assignee of the present patent application and whose disclosure is incorporated herein by reference.

If no key is pressed and no attack is present, controller 34 will detect that the measured capacitance of line 56 matches some predefined baseline capacitance. If a key is pressed by a user, the continuity of line 56 will be broken at the location of the key, and the line capacitance will therefore decrease from the baseline capacitance. The actual measured capacitance will depend on the location of the key along line 56. Pressing a key that is closer to pin 70 results in a smaller measured capacitance, and vice versa.

In an embodiment, controller 34 holds a predefined list of the expected capacitances for the respective keys 48. If a measured capacitance matches one of the expected capacitances on the list, controller 34 concludes that a legitimate key press was performed, and determines the identity of the key from the capacitance value. If controller 34 measures a capacitance that differs from any of the expected values, the controller may decide that such a measurement is indicative of an attack.

In alternative embodiments, line 56 is connected to one I/O pin 70 at one end, and to another I/O pin 70 at the opposite end. In these embodiments, controller 34 may measure the line capacitance with respect to each of the two pins 70. As described with regards to FIG. 2 above, controller 34 may then analyze both results, and decide whether no event occurred, whether a key was pressed, or whether an attack was attempted. This configuration also enables the controller to detect simultaneous pressing of two keys. This configuration may also enable applying the active shield functionality using a simple logic signal (e.g., toggle the signal state at one end of a line and check the signal state at the other end, when key strokes are not present).

FIG. 4 is a block diagram that schematically illustrates a joint active-shield and keypad-sensing circuit, in accordance with yet another embodiment of the present invention. In the embodiment of FIG. 4, controller senses key presses and detects security attacks by measuring the serial capacitance between a single line 56 and ground.

In this example, a line 56 passes serially below or adjacent to keys 48. Keys 48 in this implementation are "normally open." Each key 48 is associated with a respective capacitor 78. When a key 48 is pressed, the key connects line 56 to ground via the respective capacitor 78. Line 56 is connected to circuit 24 at one end using an I/O pin 70.

If no key is pressed and no attack is present, controller 34 will detect that the measured capacitance of line 56 matches some predefined baseline capacitance. If line 56 is cut, its measured capacitance will be smaller than the baseline capacitance. Therefore measuring an exceedingly small capacitance of line 56 may serve as attack indication. If a key is pressed by a user, the capacitance of the corresponding capacitor 78 will be added to the baseline capacitance of the line. If multiple keys are pressed, the measured capacitance will depend on the sum of the capacitances of the corresponding capacitors 78.

In an embodiment, the different capacitors 78 are given different capacitances, so that controller 34 can identify which key was pressed based on the measured capacitance.

In an embodiment, to enable multi-touch capability, the capacitances of capacitors 78 are assigned so that different combinations of capacitances will have different sums. One example possibility is to assign capacitors 78 capacitances that are power-of-two multiples of some capacitance C, e.g., C, 2C, 4C, 8C, . . . . In such an implementation, pressing of any combination of one or more keys results in a different measured capacitance. While enabling multi-touch detection, this implementation may require a large diversity of capacitor values to support many keys. One possibility to relax this requirement is to divide keys 48 among two or more lines 56, e.g., three or four keys per line.

In an embodiment, controller 34 holds a predefined list of expected capacitances for the respective keys 48 (and possibly for respective combinations of keys). If a measured capacitance matches one of the expected capacitances on the list, controller 34 concludes that a legitimate key press (possibly multi-touch) was performed, and determines the identity of the key (or keys) from the capacitance value. If controller 34 measures a capacitance that differs from any of the expected values, the controller may decide that such a measurement is indicative of an attack.

In an embodiment, the far end of line 56 in FIG. 4 can be connected to circuit 24 using an additional pin 70 (not shown). In this manner, controller 34 is able to detect attacks by detecting that the line is broken. For example, as noted above, controller 34 may toggle the signal state at one end of a line and check the signal state at the other end, when key strokes are not present.

Any of the circuit configurations shown in FIGS. 2-4 can be used for implementing joint active-shield and keypad-sensing in device 20 of FIG. 1 above. The configurations of FIGS. 2-4 are example configurations, which are chosen purely for the sake of conceptual clarity. In alternative embodiments, any other suitable configuration can be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
an electronic circuit;
a keypad comprising one or more keys for entering data to the electronic circuit by a user; and
an active-shield layer, which is placed between the electronic circuit and the keypad, and which comprises one or more electrical conductors laid in a pattern that shields at least a portion of the electronic circuit, wherein, in a specified region, the one or more electrical conductors of the active-shield layer are shaped to form contacts for sensing the one or more keys,
wherein the electronic circuit is configured to transmit at least a first signal via one or more of the electrical conductors of the active-shield layer, to receive and sense at least a second signal from the active-shield layer, and to distinguish between (i) a legitimate key activation by the user and (ii) a security attack on the electronic circuit or on the keypad, by measuring time delay between the first and second signals.

2. The apparatus according to claim 1, wherein the electronic circuit is further configured to distinguish between the legitimate key activation and the security attack by measuring a capacitance of an electrical conductor of the active-shield layer.

3. The apparatus according to claim 1, wherein the electronic circuit is further configured to distinguish between legitimate activation of a single key and legitimate activation of multiple keys.

4. The apparatus according to claim 1, wherein the electronic circuit is configured to transmit dummy signals to the active-shield layer.

5. The apparatus according to claim 1, wherein the active-shield layer is fabricated in a multi-layer substrate, and wherein, in at least a section of the active-shield layer, first and second electrical conductors of the active-shield layer are routed one beneath the other in different layers.

6. The apparatus according to claim 1, wherein the keypad and the active-shield layer are configured such that activation of a key short-circuits a pair of the electrical conductors of the active-shield layer.

7. The apparatus according to claim 1, wherein the keypad and the active-shield layer are configured such that activation of a key breaks a normally-closed electrical continuity of an electrical conductor of the active-shield layer.

8. The apparatus according to claim 1, wherein the keypad and the active-shield layer are configured such that activation of a key connects a respective capacitor to an electrical conductor of the active-shield layer.

9. A method, comprising:
transmitting at least a first signal to one or more electrical conductors of an active-shield layer, which is placed between an electronic circuit and a keypad comprising one or more keys for entering data to the electronic circuit by a user, wherein the one or more electrical conductors of the active-shield layer are laid in a pattern that shields at least a portion of the electronic circuit, and, in a specified region, the one or more electrical conductors are shaped to form contacts for sensing the one or more keys;
receiving and sensing at least a second signal from the active-shield layer; and
distinguishing between (i) a legitimate key activation by the user and (ii) a security attack on the electronic circuit or on the keypad, by measuring time delay between the first and second signals.

10. The method according to claim 9, wherein distinguishing between the legitimate key activation and the security attack further comprises measuring a capacitance of an electrical conductor of the active-shield layer.

11. The method according to claim 9, further comprising distinguishing between legitimate activation of a single key and legitimate activation of multiple keys.

12. The method according to claim 9, wherein the keypad and the active-shield layer are configured such that activation of a key performs one of:
short-circuits a pair of the electrical conductors of the active-shield layer;
breaks a normally-closed electrical continuity of an electrical conductor of the active-shield layer; and
connects a respective capacitor to an electrical conductor of the active-shield layer.

* * * * *